United States Patent [19]

Schrott et al.

[11] 4,277,135
[45] Jul. 7, 1981

[54] FIBER OPTIC CONNECTOR

[75] Inventors: Werner G. Schrott; Hans Wodok, both of Heilbronn, Fed. Rep. of Germany

[73] Assignee: Bunker Ramo Corporation, Oak Brook, Ill.

[21] Appl. No.: 85,565

[22] Filed: Oct. 17, 1979

[30] Foreign Application Priority Data

Oct. 18, 1978 [DE] Fed. Rep. of Germany ....... 2845420

[51] Int. Cl.$^3$ .............................................. G02B 5/14
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,917,383 | 11/1975 | Cook et al. ......................... | 350/96.22 |
| 3,951,514 | 4/1976 | Medina, Jr. ........................ | 350/96.22 |
| 3,999,837 | 12/1976 | Bowen et al. ...................... | 350/96.22 |
| 4,140,367 | 2/1979 | Makuch et al. .................... | 350/96.22 |
| 4,184,742 | 1/1980 | Gorrales ............................ | 350/96.20 |

Primary Examiner—Stewart J. Levy
Attorney, Agent, or Firm—F. M. Arbuckle; J. R. Hoffman

[57] ABSTRACT

This invention relates to fiber optic connectors. Connectors are known in which the optical fiber end to be connected is held in a guiding sleeve which can be shifted in a transverse direction by means of a bolt in one wall of the connector. However, alignment of the ends of the optical fibers being connected to those of a mating connector requires manual mechanical adjustment. Another fault of the prior art is that the ends of the optical fibers are unprotected when the two mating connector parts are disconnected. The present invention provides means by which an automatic adjustment of the alignment of the ends of the optical fibers is made possible, and other means by which the ends of the optical fibers are protected when the two mating connectors are separated. An optical fiber holder resiliently mounted within a connector housing permits limited displacement of the optical fibers contained within the holder, in directions perpendicular to the longitudinal axis of the optical fibers. Any misalignment with the optical fibers of a mating connector is thereby automatically corrected. In another aspect of the invention, a cover which is normally closed protects the ends of the optical fibers when the connectors are disconnected from their mating connectors. The cover is displaceable so that when the connectors are brought into close proximity to one another, the cover is opened exposing the ends of the optical fibers.

9 Claims, 7 Drawing Figures

FIBER OPTIC CONNECTOR

TECHNICAL FIELD

This invention relates to connectors for optical fibers.

BACKGROUND OF THE PRIOR ART

Prior art fiber optic connectors are known in which the optical fiber end to be connected is held in a guiding sleeve which can be shifted in a transverse direction by means of a bolt in one wall of the connector. One disadvantage of such prior art connectors is that alignment of the ends of the optical fibers being connected to those of a mating connector requires a manual mechanical adjustment. Another fault of the prior art is that the ends of the optical fibers are unprotected when the two mating connector parts are disconnected. The present invention overcomes these deficiencies in the prior art by providing means by which an automatic adjustment of the alignment of the ends of the optical fibers is made possible, and other means by which the ends of the optical fibers are protected against fouling and damage when the two mating connectors are separated.

BRIEF SUMMARY OF THE INVENTION

The present invention provides a fiber optic connector comprising a connector housing in which is mounted an optical fiber holder for retaining the end of one or more elongated optical fibers in a fixed position within the holder. The ends of the optical fibers face outwardly from the connector, that is, in a direction in which the connector is to be mated with another similarly designed connector. The holder is mounted within the connector housing by means of a resilient member which is positioned between the holder and the housing. The function of the resilient member is to permit limited displacement of the holder, and thus the optical fibers contained within the holder, in directions perpendicular to the longitudinal axis of the optical fibers. Because of the resilient mounting of the holder within the connector housing, any misalignment with the optical fibers of a mating connector is automatically corrected, and precise optical alignment of the optical fibers is thereby facilitated.

In another aspect of the invention, a cover is provided in order to protect the ends of the optical fibers during the time the connectors are not in use, i.e. when the connectors are disconnected from their mating connectors. The cover is displaceable so that when the connectors are brought into close proximity to one another, the cover is opened exposing the ends of the optical fibers. When the connectors are disconnected, the cover is automatically closed providing protection for the ends of the optical fibers.

BRIEF DESCRIPTION OF THE DRAWINGS

The invention will now be described in detail with reference to the accompanying drawings, representing preferred embodiments of fiber optic connecters according to the present invention.

DETAILED DESCRIPTION OF THE INVENTION

Figure 1:
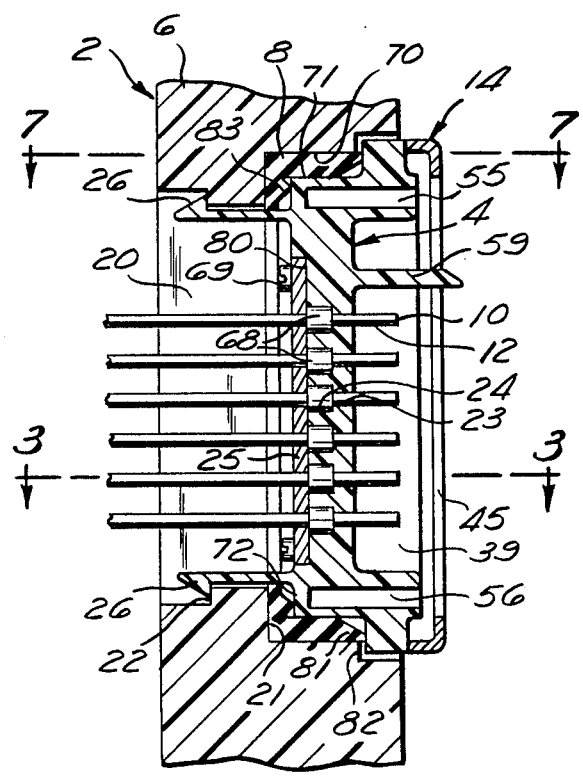
FIG. 1 is a cross-sectional view of a plug or male connector according to the instant invention.

Referring to FIG. 1, the plug, or male connector, 2 has a housing 6. The housing 6 has a central opening 20 with a peripheral outwardly directed recessed front face 21 and oppositely directed recessed rear faces 22 located at opposite ends of opening 20. An optical fiber holder 4 is inserted from the outside into the opening 20. Holder 4 consists of a middle web portion provided with bores 23 to receive the optical fibers 12. The diameters of bores 23 are chosen to receive and hold firmly the optical fibers 12. Bores 23 open into depressions 24 for the reception of mechanical supporting elements 68 of the optical fibers 12. After inserting the optical fibers 12 into bores 23, the fibers are fastened in position by means of supporting plate 25 which is screwed to holder 4 in recess 80 with screws 69. Resilient sleeve 8 is placed between housing 6 and holder 4. Sleeve 8 lies between the inner wall 70 of the opening 20 and the outer wall 71 of holder 4, and between the outwardly directed face 21 and the rear outer wall portions 72 of holder 4. The tips 81 of sleeve 8 are tapered and extend beyond outwardly directed face 82 of housing 6. Sleeve 8 has a predetermined wall thickness such that holder 4 is restorably displaceable in all directions perpendicular to the axes of the optical fibers 12 without requiring manual adjustment.

On its rear side, holder 4 has latching elements 26 extending in the direction of the axes of optical fibers 12. These latching elements 26 attach holder 4 to housing 6 when holder 4 is inserted into housing 6 by latching onto faces 22 and thereby forming a releasable latching connection. Latching elements 26 limit forward movement of the holder 4 relative to housing 6, while rear wall 72 engaging projections 83 in sleeve 8 limits movement of holder 4 against sleeve 8 rearwardly into opening 20 of housing 6.

Figure 2:
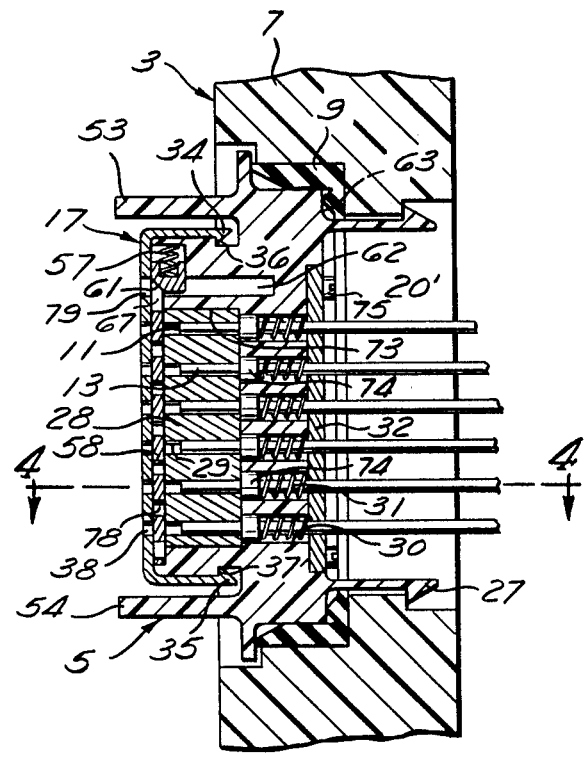
FIG. 2 is a cross-sectional view of the socket or female connector of the present invention.

The socket, or female connector, 3 is of analogous design (see FIG. 2). The construction of housing 7 is identical to that of housing 6. Holder 5 mounts in opening 20' and is formed similarly to holder 4. Sleeve 9, preferably made of rubber, resiliently supports holder 5 in housing 7 so that holder 5, and thus optical fibers 13 held in holder 5, are displaceable in every direction perpendicular to the axes of optical fibers 13. Latching elements 27 are similar to latching elements 26 in plug 2. Latching elements 27 limit forward movement of said holder 5 relative to housing 7, while rear wall 63 limits movement of holder 5 against sleeve 9 rearwardly into opening 20' of housing 7.

Holder 5 of socket 3 has a recess 73 in its outer forward end for receiving guide block 28 which is made of a wear-resistant material, such as steel. Bores 29 are provided in guide block 28 and correspond in diameter to that of optical fibers 13 and likewise to that of bores 23 of plug 2. Bores 30 are provided in holder 5 and are of a diameter greater than that of bores 29 in order to accommodate mechanical supporting elements 74 for optical fibers 13 as well as springs 31. Pressure plate 32 is provided on the rear side of holder 5 in recess 64 and is connected thereto by screws 75. Plate 32 presses optical fibers 13 with a spring prestressing force into bores 29. Guide block 28 is held in holder 5 by means of detents 65 in recesses 66 (see FIG. 4).

Cover 17 is attached to holder 5 by means of latches 34 and 35 which attach to shoulders 36 and 37, respectively, to provide a latch connection. Cover 17 is provided with bores 38 which are aligned with bores 29 in guide block 28.

Figure 4:
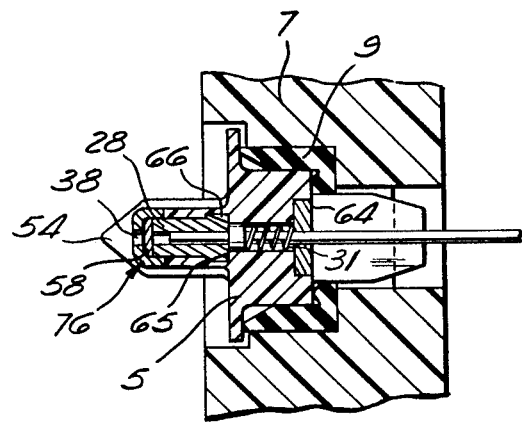
FIG. 4 is a cross-sectional view taken along the line 4—4 in FIG. 2.

Cover 17, together with portions of guide block 28 and holder 5 projects from the front of socket 3 as is best shown in FIGS. 2 and 4. The projecting portion 76 is generally in the form of a parallelepiped and corresponds in height and width to recess 39 in holder 4 of plug 2 (FIG. 1), so that when plug 2 and socket 3 are brought into engagement for mating purposes, the connection between plug 2 and socket 3 is facilitated by the guiding action of projecting portion 76 fitting within recess 39. The net result of the construction is that the ends 10 of optical fibers 12 are guided into the bores 29 of guide block 28, which are machined with a very small tolerance, and are aligned with the ends 11 of optical fibers 13 in order to provide precise optical alignment of fibers 12 and 13.

Figure 3:
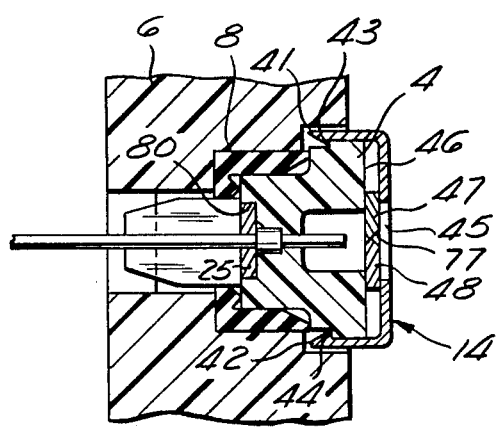
FIG. 3 is a cross-sectional view along the line 3—3 in FIG. 1.
Figure 6:
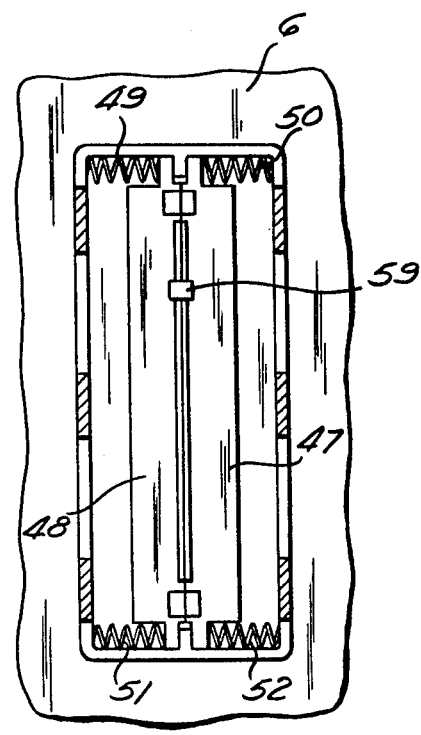
FIG. 6 is a vertical elevational view of the plug or male connector with the outer cover part omitted for better understanding.
Figure 7:
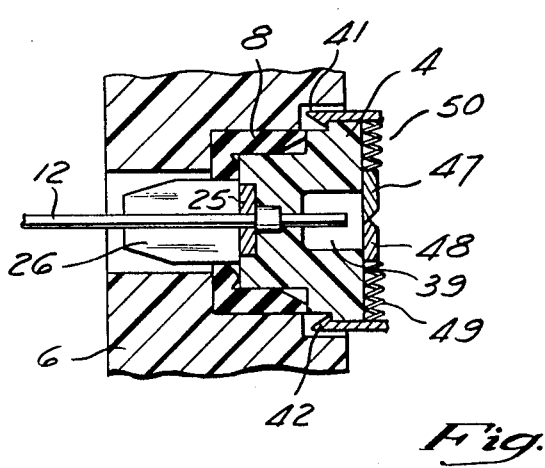
FIG. 7 is a cross-sectional view taken along the line 7—7 in FIG. 1, wherein the sidewalls only of the cover are shown for better understanding.

Damage to the ends 10 of optical fibers 12 in plug 2 and ends 11 of optical fibers 13 in socket 3, is prevented when plug 2 and socket 3 are not in mating connection by means of cover 14 of plug 2 and cover 17 of socket 3. Cover 14 fits over the forward face of holder 4 and is connected by latches 41 and 42 (FIG. 3) which attach to shoulders 43 and 44 of holder 4. Between cover 14 and front surface 46 of holder 4 two plates 47 and 48 are free to slide between cover 14 and surface 46 in a lateral direction relative to the ends of optical fibers 12. Plates 47 and 48 are prestressed towards the center of recess 39 by means of springs 49, 50, 51 and 52 as shown in FIGS. 6 and 7. In the prestressed position, plates 47 and 48 cover recess 39 protecting the optical fibers 12, and particularly the ends 10 thereof. Opening 45 is provided in cover 14 to expose plates 47 and 48.

Figure 5:
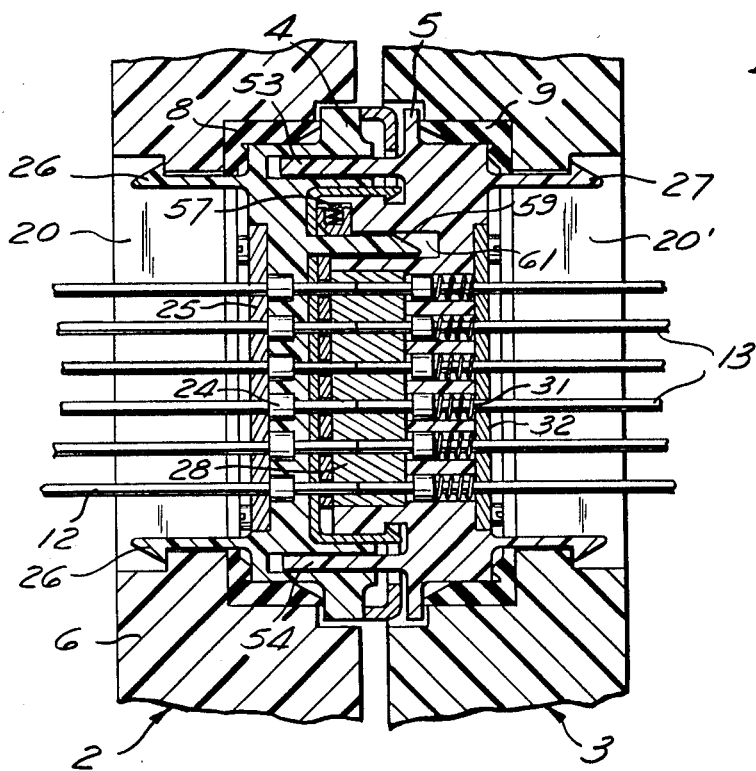
FIG. 5 is a cross-sectional view similar to those of FIGS. 1 and 2 where the male connector and female connector have been brought into engagement.

On the front side of holder 5 (FIG. 2), there are provided wedges 53 and 54 which project outwardly and are designed to interact with plates 47 and 48, engaging the beveled inner edges 77 thereof to cause plates 47 and 48 to slide against the prestressing of springs 49, 50, 51 and 52 to clear recess 39 when plug 2 and socket 3 are mated. Holder 4 is provided with recesses 55 and 56 at points corresponding to wedges 53 and 54 on holder 5 of socket 3. As shown in FIG. 5, wedges 53 and 54 slide into recesses 55 and 56 when plug 2 and socket 3 are engaged. Further, wedges 53 and 54 enter recesses 55 and 56 before optical fibers 12 of plug 2 enter bores 29 of guide block 28 of socket 3.

The cover assembly for socket 3, as shown in FIGS. 2, 4 and 5, includes a plate 58 located between cover 17 and the front face of guide block 28. Plate 58 has bores 78 spaced the same as those of bores 29 of guide block 28. Bores 78 are normally held out of alignment with bores 29 by means of spring 57 in order to protect optical fibers 13 and particularly the ends 11 thereof against fouling or mechanical damage when socket 3 is disengaged from plug 2.

A recess 62 is provided in holder 5 in a position corresponding to that of wedge 59 (FIG. 1) which projects from the outer face of holder 4 of plug 2 and extends through cover 14 of plug 2 between plates 47 and 48. Upon engaging plug 2 with socket 3, wedge 59 passes through opening 79 in cover 17 and engages beveled sidewall 61 of recess 67 in plate 58. Wedge 59, as it is inserted into recess 62, opposes the compressive force of spring 57 to slide plate 58 into a position where bores 78 in plate 58 are aligned with bores 29 in guide block 28. As plug 2 is further engaged with socket 3, optical fibers 12 held in holder 4 of plug 2 are introduced into guide block 28 and aligned with ends 11 of optical fibers 13. Full engagement of plug 2 and socket 3 results in precise optical alignment of optical fibers 12 and 13. Upon disengagement of plug 2 and socket 3, the removal of wedge 59 from recess 62 results in plate 58 being returned to its closed position by action of spring 57. In this position, the bores 78 in plate 58 are misaligned with bores 29 in guide block 28 resulting in the ends 11 of optical fibers 13 being protected from fouling and damage.

The above described fiber optic connector enables the accurate coupling of optical fibers which are automatically protected in their uncoupled state. The resilient mounting of the optical fiber holders by means of rubber sleeves results in compensation for permissible lateral displacement of the optical fibers during coupling. The resilient mounting also results in the ends of the optical fibers in the coupled state being firmly pressed against one another. The fiber optic connectors described in this invention can be used wherever automatic coupling of optical fibers is desired, such as in the connection of optical fibers of intercoupled vehicles, especially railroad cars.

From the foregoing, it can be readily realized that this invention can assume various embodiments. Thus, it is to be understood that the invention is not limited to the specific embodiments described herein, but is to be limited only by the appended claims.

We claim:

1. A fiber optic connector comprising: an optical fiber holder having an outer first face and a second face parallel to said first face and inwards thereof facing in the same direction as said first face, said holder including means for retaining at least one elongated optical fiber adjacent the end thereof in a fixed position within said holder perpendicular to and adjacent said second face, said holder further including at least one elongated recess in one of said first and second faces, said recess being generally parallel to the longitudinal axis of said optical fiber, said holder further including at least one wedge means projecting from the other of said first and second faces parallel to said recess, said recess and wedge means being adapted to fit a corresponding wedge means and recess, respectively, in a cooperating connector upon mating of said connector and said cooperating connector; and a cover attached to said holder, said cover including closure means slidable upon said first face from a normally closed position covering the end of said optical fiber to an open position exposing the end of said optical fiber, and biasing means maintaining said closure means in a closed position.

2. The connector as claimed in claim 1, wherein said holder includes a plurality of bores for retaining a plurality of said optical fibers in a generally parallel relationship with each other.

3. The connector as claimed in claim 2, further comprising a guide block attached to said holder, said guide block having a plurality of bores aligned with said plurality of bores in said holder and having diameters corresponding to the diameters of said optical fibers.

4. The connector as claimed in claim 3, wherein said closure means is slidable upon said guide block and said first face.

5. The connector as claimed in claim 1, wherein said closure means comprises: two plate halves having an indentation from the center line of each plate half to permit said wedge means to protrude therethrough; and means to accommodate wedge means of a cooperating connector of similar design adapted to mate with said connector.

6. The connector as claimed in claim 2, wherein said closure means comprises a plate having apertures, the alignment of which corresponds to the alignment of said optical fibers when said cover is in said open position, said apertures being urged out of alignment with said optical fibers when said cover is in said closed position.

7. The connector as claimed in claim 1, wherein said wedge means projects beyond said cover.

8. The connector as claimed in claim 1, wherein said wedge means projects through an opening in said cover.

9. The connector as claimed in claim 1, wherein said cover has an opening corresponding to said recess.

* * * * *